(12) United States Patent
Chiu

(10) Patent No.: US 10,589,831 B2
(45) Date of Patent: Mar. 17, 2020

(54) MULTI-AXIS AIRCRAFT WITH A WIND RESISTANT UNIT

(71) Applicant: Nan-Chang Chiu, Kaohsiung (TW)

(72) Inventor: Nan-Chang Chiu, Kaohsiung (TW)

( * ) Notice: Subject to any disclaimer, the term of this patent is extended or adjusted under 35 U.S.C. 154(b) by 451 days.

(21) Appl. No.: 15/620,874

(22) Filed: Jun. 13, 2017

(65) Prior Publication Data

US 2017/0369143 A1    Dec. 28, 2017

(30) Foreign Application Priority Data

Jun. 27, 2016    (TW) .............................. 105120118 A

(51) Int. Cl.
*B64C 27/08* (2006.01)
*B64C 1/00* (2006.01)
*B64C 39/02* (2006.01)

(52) U.S. Cl.
CPC ............ *B64C 1/0009* (2013.01); *B64C 27/08* (2013.01); *B64C 39/024* (2013.01); *B64C 2201/027* (2013.01); *B64C 2201/108* (2013.01)

(58) Field of Classification Search
CPC ........ B64C 2201/108; B64C 2201/027; B64C 27/08; B64C 1/0009; B64C 39/024
See application file for complete search history.

(56) References Cited

U.S. PATENT DOCUMENTS

2016/0200415 A1* 7/2016 Cooper .................. A63H 27/12
244/17.15

* cited by examiner

*Primary Examiner* — Philip J Bonzell
*Assistant Examiner* — Tye William Abell
(74) *Attorney, Agent, or Firm* — Alan D. Kamrath; Mayer & Williams PC

(57) ABSTRACT

A multi-axis aircraft with a wind resistant unit includes a fuselage having an upper face and a lower face. The fuselage includes a central axis passing through the upper face and the lower face. A plurality of rotors is mounted to the fuselage. Each rotor includes a rotating axis parallel to the central axis. A wind resistant unit includes a plurality of wind barriers disposed in a radial direction perpendicular to a reference axis. Each wind barrier includes a plurality of rods fixed by at least one fixing member. Two adjacent rods have a passage therebetween. Each rod includes an axis proximal end facing the reference axis and an axis remote end remote to the reference axis. Each wind barrier includes a coupling end and an airflow diversion end. The coupling end is fixed by at least one coupling member to the upper face of the fuselage.

9 Claims, 4 Drawing Sheets

MULTI-AXIS AIRCRAFT WITH A WIND RESISTANT UNIT

CROSS REFERENCE TO RELATED APPLICATIONS

The application claims the benefit of Taiwan application serial No. 105120118, filed on Jun. 27, 2016, and the entire contents of which are incorporated herein by reference.

BACKGROUND OF THE INVENTION

1. Field of the Invention

The present invention relates to a multi-axis aircraft and, more particularly, to a multi-axis aircraft with a wind resistant unit.

2. Description of the Related Art

A rotor type aircraft, such as a helicopter, can fly with maneuverability to proceed with vertical takeoff and landing. The rotor type aircraft includes a main rotor to provide the lift. However, the rotating main rotor generates a torque that will cause in situ spinning of the aircraft. Thus, the rotor type aircraft, such as a helicopter, includes a smaller auxiliary rotor at the tail to counterbalance the torque generated by the main rotor, thereby avoiding in situ spinning. However, the torque balance system of the rotor type aircraft, such as a helicopter, is complicated. Therefore, small drones or remotely controlled aircrafts generally use multiple axes. A typical conventional multi-axis aircraft, such as a three-axis aircraft or a four-rotor aircraft, uses a plurality of rotors on the same plane to generate a lift for lifting the multi-axis aircraft. These rotors have the same size and are symmetrically disposed on the multi-axis aircraft, such that the rotors can provide balanced torques easier than the conventional helicopters having a main rotor and an auxiliary rotor. However, when subject to a strong wind, the airstream above and driven by each rotor of the multi-axis aircraft is apt to be disturbed by the strong wind. Thus, the airstream above each rotor is affected by sideward airstreams, leading to an unbalanced lift provided by the rotors. As a result, the multi-axis aircraft flies unstably and has risks of flipping and falling.

Thus, improvement to the conventional multi-axis aircrafts is necessary.

SUMMARY OF THE INVENTION

To solve the above disadvantages, the present invention provides a multi-axis aircraft with a wind resistant unit that will not be affected by strong winds and that is less likely to flip.

When the terms "front", "rear", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

A multi-axis aircraft with a wind resistant unit according to the present invention includes a fuselage having an upper face and a lower face opposite to the upper face. The fuselage includes a central axis passing through the upper face and the lower face. A plurality of rotors is mounted to the fuselage. Each of the plurality of rotors includes a rotating axis and a rotating radius. Each rotating axis is parallel to the central axis. A wind resistant unit includes a plurality of wind barriers and a reference axis. Each of the plurality of wind barriers is disposed in a radial direction perpendicular to the reference axis. Each of the plurality of wind barriers includes a plurality of rods, at least one fixing member, and at least one coupling member. The plurality of the rods is fixed by the at least one fixing member. Two adjacent rods have a passage therebetween. Each of the plurality of rods includes an axis proximal end and an axis remote end opposite to the axis proximal end. Each of the plurality of wind barriers includes a coupling end and an airflow diversion end opposite to the coupling end. The coupling end is fixed by the at least one coupling member to the upper face of the fuselage. The axis proximal end of each of the plurality of rods faces the reference axis. The axis remote end of each of the plurality of rods is remote to the reference axis.

Thus, through use of the wind resistant unit of the multi-axis aircraft according to the present invention, when the multi-axis aircraft is moving or ascending, the airstreams or the encountered strong wind is guided and distributed to locations above the rotors, increasing the stability of the multi-axis aircraft when the airstreams above the rotors are interfered by the strong wind. Thus, a wind resistant effect and flying stability of the multi-axis aircraft can be achieved.

In an example, the multi-axis aircraft includes at least three rotors. Thus, the multi-axis aircraft can fly with better maneuverability to permit easier flight.

In an example, each rod is hollow to reduce the weight of the wind resistant unit, thereby reducing the burden to the aircraft during flight while reducing the power consumption of the multi-axis aircraft.

In an example, each rod is cylindrical, and the axis remote end of each rod is semi-spherical. This avoids the airstreams passing the rods from generating turbulence, increasing the flying stability.

In an example, the wind barriers are angularly disposed around the reference axis at regular intervals. Thus, the guided airstreams are distributed more uniformly to increase the flying stability.

In an example, the axis proximal end of each rod starts from the reference. Thus, the axis proximal ends of the rods are connected to each other to form an integral wind barrier, reducing the influence of the disturbance caused by the airstream passing through the reference axis. The flying stability and the structural strength of the wind resistant unit are, thus, increased.

In an example, the passages of the rods have an identical height in the vertical direction. Thus, the downward airstreams to be baffled and guided downward as well as the airstreams passing through the passages can be distributed uniformly to increase the wind resisting capacity.

In an example, the lengths of the rods decrease from the coupling end toward the airflow diversion end in regular decrements. Thus, during the upward movement of the multi-axis aircraft, the wind resistant unit guides the airstreams to flow downward. Thus, the respective rods withstand a portion of the downward wind resistance to reduce the wind resistance of the rod at the airflow diversion end, increasing the flying stability of the multi-axis aircraft. Furthermore, the rods with decreasing lengths reduce the weight of the wind resistant unit.

In an example, a rotor connecting line passes through the rotating axes respectively of two adjacent rotors. A line spacing is the shortest distance between the rotor connecting line and the central axis. The length of the rod at the coupling end is larger than the line spacing and is smaller than a sum of the line spacing and the rotating radius. Thus, the airstream above the rotating axis of each rotor can be guided by the rod at the coupling end toward each rotor while forming a stable airstream. Since the length of the rod at the coupling end is larger than the line spacing, the airstream above each rotor can be guided by the rod at the coupling end to the rotor, forming a stable airstream while increasing the wind resisting capacity.

The present invention will become clearer in light of the following detailed description of illustrative embodiments of this invention described in connection with the drawings.

DETAILED DESCRIPTION OF THE INVENTION

Figure 1:
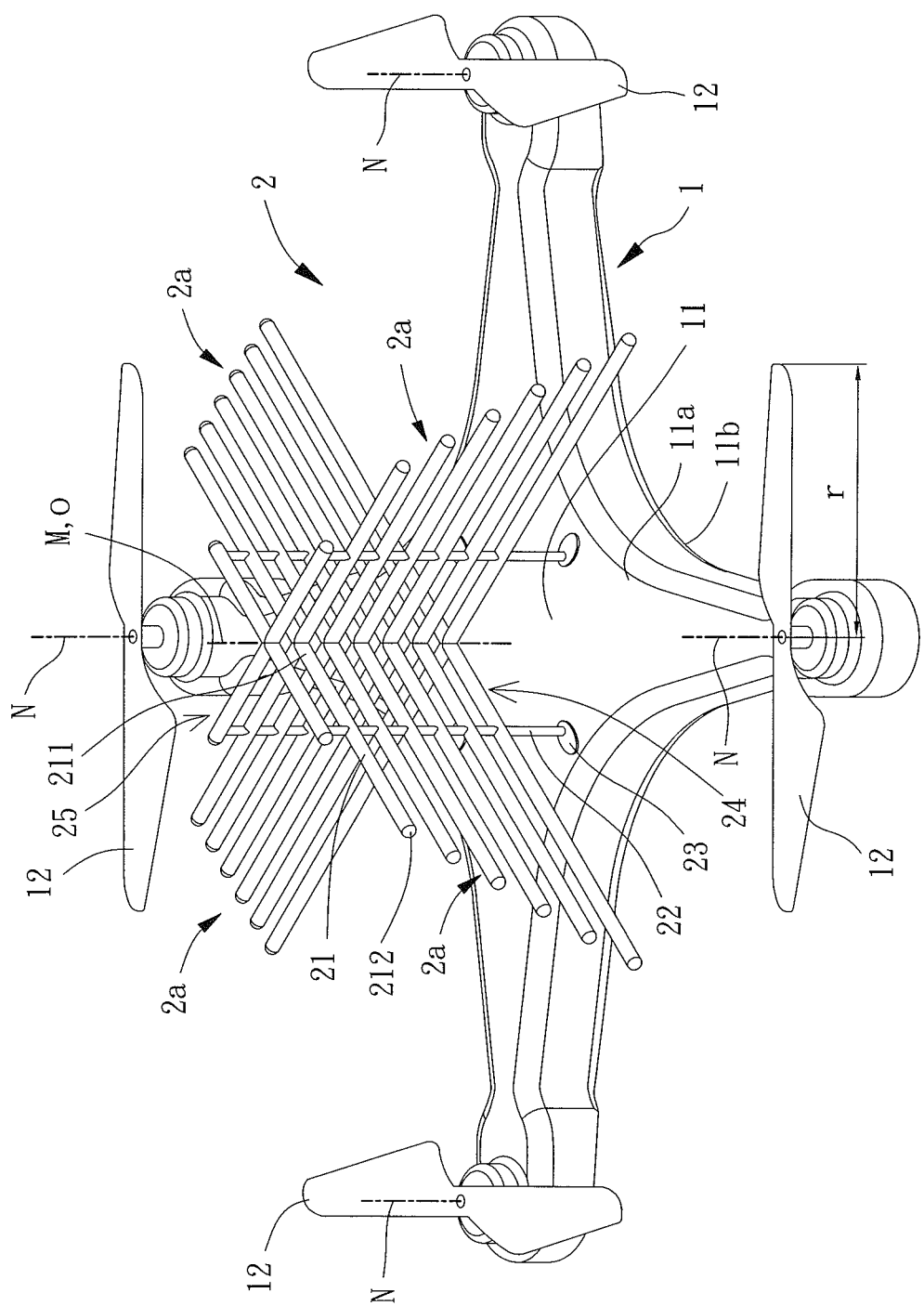
FIG. 1 is a partial, perspective view of a multi-axis aircraft with a wind resistant unit of an embodiment according to the present invention.

FIG. 1 shows a multi-axis aircraft 1 with a wind resistant unit 2 of an embodiment according to the present invention. The wind resistant unit 2 is fixed on top of the multi-axis aircraft 1.

The multi-axis aircraft 1 includes a fuselage 11 and a plurality of rotors 12. The number of the rotors 12 is at least three. Thus, the multi-axis aircraft 1 can fly with better maneuverability. The fuselage 11 includes an upper face 11a and a lower face 11b opposite to the upper face 11a. The fuselage 11 includes a central axis M passing through the upper face 11a and the lower face 11b. The rotors 12 are mounted to the fuselage 11. The rotors 12 can be angularly disposed around the central axis M at regular intervals. Each rotor 12 includes a rotating axis N and a rotating radius r. Each rotating axis N is parallel to the central axis M of the fuselage 11. In a non-restrictive example, the multi-axis aircraft 1 is a four-axis aircraft. The rotors 12 have equal spacing to the central axis M. Alternatively, the rotors 12 of the multi-axis aircraft 1 are angularly disposed around the central axis M at regular intervals. Thus, the multi-axis aircraft 1 has a balanced lift and has better stability during flight. The rotors 12 have an identical rotating radius r.

Figure 2:
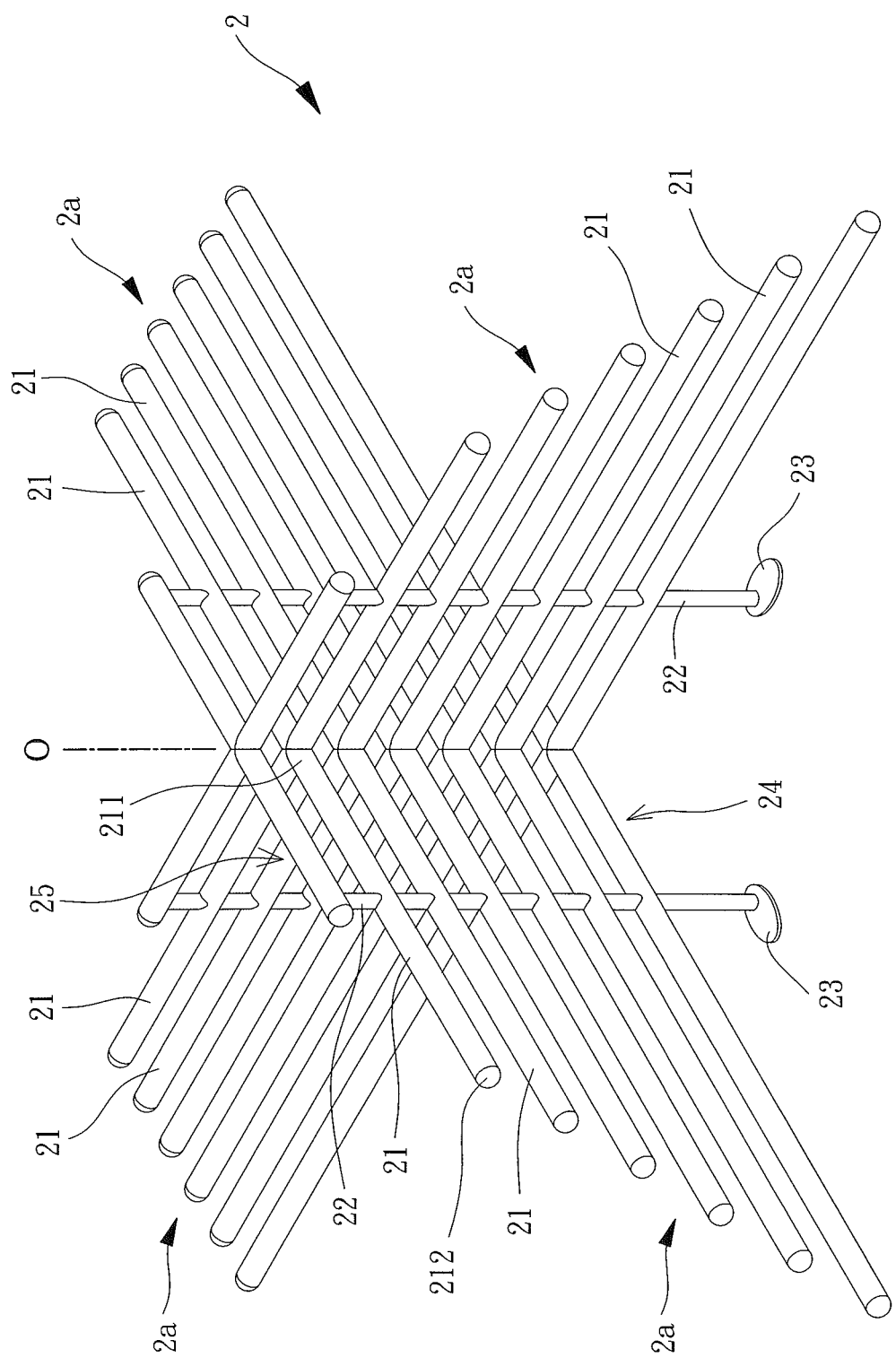
FIG. 2 is a perspective view of the wind resistant unit of the multi-axis aircraft of the embodiment according to the present invention.
Figure 3:
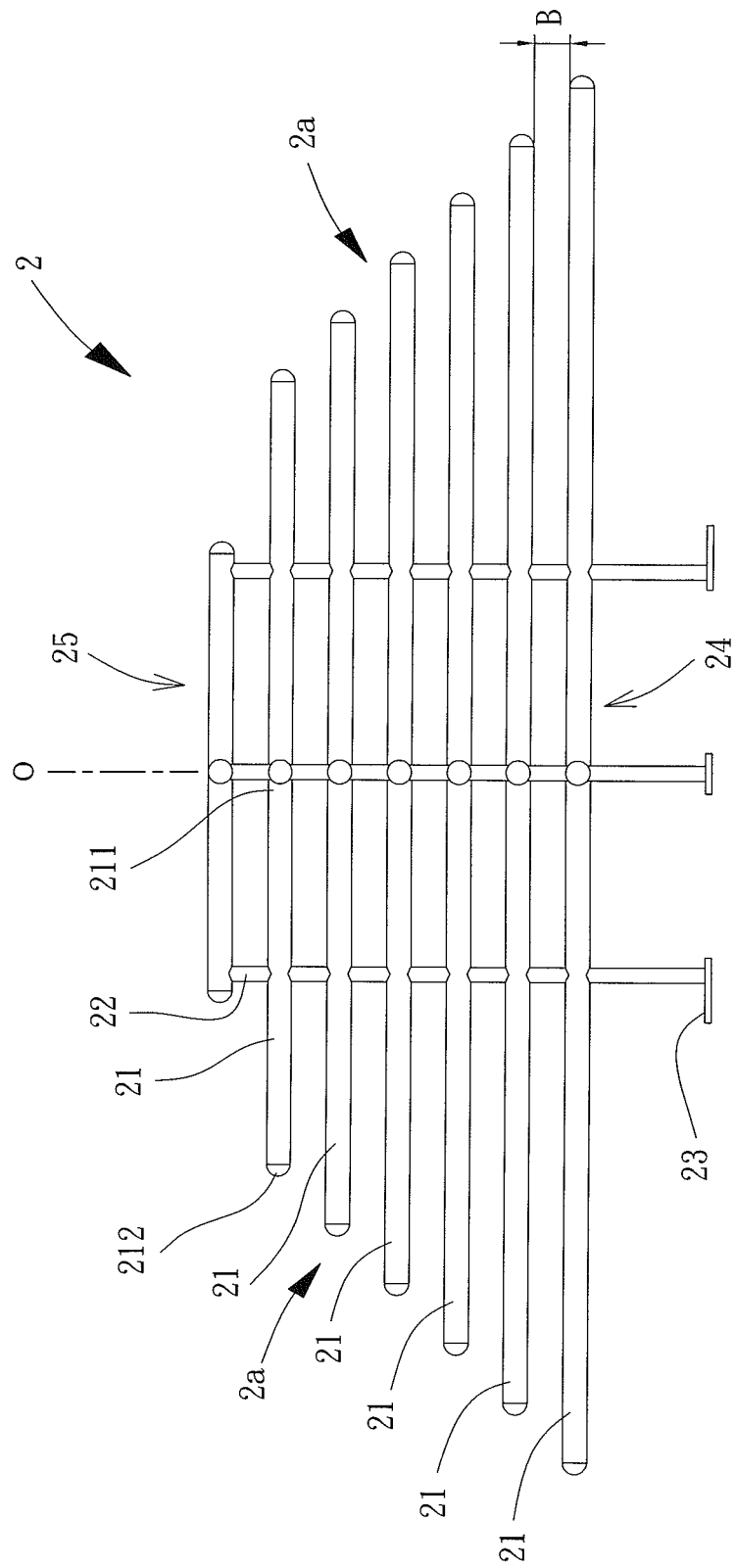
FIG. 3 is a front elevational view of the wind resistant unit of the multi-axis aircraft of the embodiment according to the present invention.

With reference to FIGS. 2 and 3, the wind resistant unit 2 includes a plurality of wind barriers 2a and a reference axis O. Each wind barrier 2a includes a plurality of passages B spaced from each other in a vertical direction. Each wind barrier 2a baffles a portion of an airstream and permits another portion of the airstream to pass through the passages B. Each wind barrier 2a is disposed in a radial direction perpendicular to the reference axis O. The number of the wind barriers 2a corresponds to the number of the rotors 12. In a case that the number of the rotors 12 is a multiple of three, the number of the wind barriers 2a can be three. In another case that the number of the rotors 12 is a multiple of four, the number of the wind barriers 2a can be four. Each wind barrier 2a includes a plurality of rods 21, at least one fixing member 22, and at least one coupling member 23. The rods 21 are fixed by the at least one fixing member 22. In this embodiment, the at least one fixing member 22 extends through the rods 21, such that two adjacent rods 21 have a passage B therebetween. Each rod 21 includes an axis proximal end 211 and an axis remote end 212 opposite to the axis proximal end 211. Each wind barrier 2a includes a coupling end 24 and an airflow diversion end 25 opposite to the coupling end 24. With reference to FIG. 1, the coupling end 24 is fixed by the at least one coupling member 23 to the upper face 11a of the fuselage 11. The axis proximal end 211 of each rod 21 faces the reference axis O, and the axis remote end 212 of each rod 21 is remote to the reference axis O. The reference axis O can be coincident with the central axis M. Each rod 21 can be hollow to reduce the weight of the wind resistant unit 2, thereby reducing the burden to the aircraft 1 during flight. Each rod 21 can be cylindrical, and the axis remote end 212 of each rod 21 can be semi-spherical. This avoids the airstreams passing the rods 21 from generating turbulence.

Figure 4:
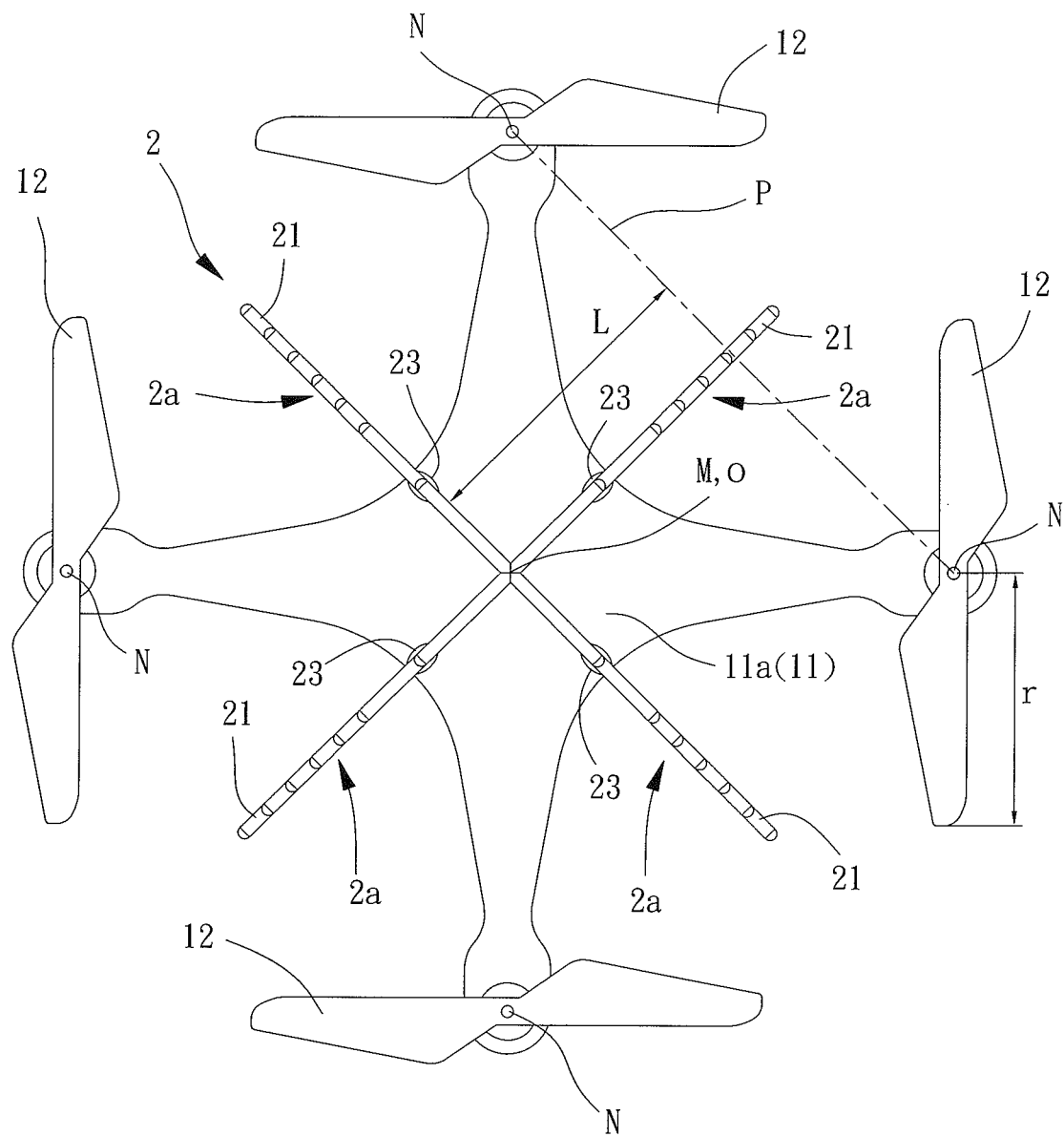
FIG. 4 is a top view of the multi-axis aircraft of the embodiment according to the present invention.

With reference to FIG. 4, the wind barriers 2a can be angularly disposed around the reference axis O at regular intervals. Each wind barrier 2a is located between two adjacent rotors 12. Thus, the guided airstreams are distributed more uniformly. The axis proximal end 211 of each rod 21 starts from the reference axis O. Thus, the axis proximal ends 211 of the rods 21 are connected to each other to form an integral wind barrier 2a, thereby increasing the structural strength of the wind resistant unit 2 while reducing the influence of the disturbance caused by the airstream passing through the reference axis O. In this embodiment, the number of the wind barriers 2a is four. The rods 21 of the four wind barriers 2a are connected to form a cruciform rod assembly. With reference to FIG. 1, the at least one fixing member 22 and the at least one coupling member 23 are integrally formed as an inseparable member. The at least one coupling member 23 can be fixed to the upper face 11a of the fuselage 11 by screwing, bonding, or any other suitable provision.

With reference to FIG. 3, the passages B of the rods 21 have an identical height in the vertical direction. Thus, the downward airstreams to be baffled and guided downward as well as the airstreams passing through the passages B can be distributed uniformly. The lengths of the rods 21 decrease from the coupling end 24 toward the airflow diversion end 25 in regular decrements. Namely, the length of the rod 21 at the airflow diversion end 25 is smaller than the length of the rod 21 at the coupling end 24. Thus, the windage area of the rod 21 at the airflow diversion end 25 is smaller. Consequently, during the upward movement of the multi-axis aircraft 1, the wind resistant unit 2 guides the airstreams to flow downward. Thus, the respective rods 21 withstand a portion of the downward wind resistance to reduce the wind resistance of the rod 21 at the airflow diversion end 25, increasing the flying stability of the multi-axis aircraft 1. Furthermore, the rods 21 with decreasing lengths reduce the weight of the wind resistant unit 2.

With reference to FIG. 4, a rotor connecting line P passes through the rotating axes N respectively of two adjacent rotors 12. A line spacing L is the shortest distance between the rotor connecting line P and the central axis M. The length of the rod 21 at the coupling end 24 is larger than the line spacing L and is smaller than a sum of the line spacing L and the rotating radius r. Thus, the airstream above the rotating axis N of each rotor 12 can be guided by the rod 21 at the coupling end 24 toward each rotor 12 while forming a stable airstream.

In view of the foregoing, when the multi-axis aircraft 1 with a wind resistant unit 2 according to the present invention is being started, the rotors 12 bring the airstreams above the rotors 12 downward. Furthermore, the wind resistant unit 2 divides the airstream section into a plurality of sections to respectively guide the downward airstreams to the respective rotors 12, forming downward airstreams along the wind barriers 2a. Thus, the respective airstreams above the rotors 12 of the multi-axis aircraft 1 will not interference with each other. In a case that the multi-axis aircraft 1 is interfered by a sideward airstream, when the sideward airstream comes in contact with the wind resistant unit 2, a portion of the sideward airstream is baffled by the wind barriers 2a and is guided downward by the above-mentioned downward airstreams. Furthermore, the portion of the sideward airstream is guided to two rotors 12 at the windward side. Furthermore, another portion of the sideward airstream flows through the passages B to the other two rotors 12 at the leeward side. The downward airstreams brought downward by two rotors 12 at the leeward side guide another portion of the sideward airstream passing through the passages B to flow downward. Thus, a wind resistant effect and a stable flight of the multi-axis aircraft 1 can be achieved.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A multi-axis aircraft with a wind resistant unit, comprising:
   a fuselage including an upper face and a lower face opposite to the upper face, with the fuselage including a central axis passing through the upper face and the lower face, with a plurality of rotors mounted to the fuselage, with each of the plurality of rotors including a rotating axis and a rotating radius, and with each rotating axis being parallel to the central axis; and
   a wind resistant unit including a plurality of wind barriers and a reference axis, with each of the plurality of wind barriers disposed in a radial direction perpendicular to the reference axis, with each of the plurality of wind barriers including a plurality of rods, at least one fixing member, and at least one coupling member, wherein the plurality of rods is fixed by the at least one fixing member, wherein two adjacent rods have a passage therebetween, wherein each of the plurality of rods includes an axis proximal end and an axis remote end opposite to the axis proximal end, wherein each of the plurality of wind barriers includes a coupling end and an airflow diversion end opposite to the coupling end, wherein the coupling end is fixed by the at least one coupling member to the upper face of the fuselage, wherein the axis proximal end of each of the plurality of rods faces the reference axis, and wherein the axis remote end of each of the plurality of rods is remote to the reference axis.

2. The multi-axis aircraft with the wind resistant unit as claimed in claim 1, wherein the plurality of rotors includes at least three rotors.

3. The multi-axis aircraft with the wind resistant unit as claimed in claim 1, wherein each of the plurality of rods is hollow.

4. The multi-axis aircraft with the wind resistant unit as claimed in claim 1, wherein each of the plurality of rods is cylindrical, and wherein the axis remote end of each of the plurality of rods is semi-spherical.

5. The multi-axis aircraft with the wind resistant unit as claimed in claim 1, wherein the plurality of wind barriers is angularly disposed around the reference axis at regular intervals.

6. The multi-axis aircraft with the wind resistant unit as claimed in claim 1, wherein the axis proximal end of each of the plurality of rods starts from the reference axis, and wherein the axis proximal ends of the plurality of rods are connected to each other.

7. The multi-axis aircraft with the wind resistant unit as claimed in claim 1, wherein the passages of the plurality of rods have an identical height.

8. The multi-axis aircraft with the wind resistant unit as claimed in claim 1, wherein the plurality of rods have lengths decreasing from the coupling end toward the airflow diversion end in regular decrements.

9. The multi-axis aircraft with the wind resistant unit as claimed in claim 1, wherein a rotor connecting line passes through the rotating axes respectively of two adjacent rotors, wherein a line spacing is a shortest distance between the rotor connecting line and the central axis, wherein the length of one of the plurality of rods at the coupling end is larger than the line spacing and is smaller than a sum of the line spacing and the rotating radius.

* * * * *